United States Patent [19]
Melvin et al.

[11] Patent Number: 5,706,013
[45] Date of Patent: Jan. 6, 1998

[54] NONHOMOGENEITY DETECTION METHOD AND APPARATUS FOR IMPROVED ADAPTIVE SIGNAL PROCESSING

[75] Inventors: William L. Melvin, Rome; Michael C. Wicks, Utica; Pinyuen Chen, Dewitt, all of N.Y.

[73] Assignee: The United States of America as represented by the Secretary of the Air Force, Washington, D.C.

[21] Appl. No.: 694,577

[22] Filed: Aug. 9, 1996

[51] Int. Cl.$^6$ .................................................. G01S 13/00
[52] U.S. Cl. .................. 342/159; 346/16; 346/195
[58] Field of Search .................. 342/159, 195, 342/65, 63, 59, 16; 364/724.05, 516, 517, 574; 367/135, 901

[56] References Cited

U.S. PATENT DOCUMENTS

| | | | |
|---|---|---|---|
| 4,786,908 | 11/1988 | Runnalls | 342/63 |
| 5,233,541 | 8/1993 | Corwin et al. | 342/195 |
| 5,276,632 | 1/1994 | Corwin et al. | 364/578 |
| 5,610,612 | 3/1997 | Piper | 342/195 |

*Primary Examiner*—Daniel T. Pihulic
*Attorney, Agent, or Firm*—Harold L. Burstyn

[57] ABSTRACT

Apparatus and method for improving detection of targets in a radar system that employs adaptive filtering. A nonhomogeneity detector eliminates nonhomogeneous signals from the population of signals received. An adaptive filter weight controller estimates covariance matrices from only homogenous signals. Thus the apparatus and method improves the probability of detecting the presence or absence of a target at the same time that it decreases the probability of a false alarm by improving the performance of an adaptive filter. Though developed for airborne radar, the apparatus and method may be applied to the processing of any image.

21 Claims, 13 Drawing Sheets

5,706,013

NONHOMOGENEITY DETECTION METHOD AND APPARATUS FOR IMPROVED ADAPTIVE SIGNAL PROCESSING

STATEMENT OF GOVERNMENT INTEREST

The invention described herein may be manufactured and used by or for the Government for governmental purposes without the payment of any royalty thereon.

BACKGROUND OF THE INVENTION

The present invention relates generally to adaptive signal processing. In particular, it relates to adaptive filtering for enhanced airborne radar. Adaptive filtering holds the potential to dramatically increase the ratio of the signal to interference-plus-noise ("SINR") prior to detection and tracking.

Maximizing SINR is the primary function of an adaptive filter and an important step in detecting a weak target buried in strong interference. However, a fundamental problem in airborne radars that employ adaptive filters is that the environment is nonhomogeneous. A nonhomogeneous environment complicates control of the adaptive filter's response, thereby leading to a severe degradation in performance.

An adaptive filter processes the signals received by the airborne radar. Adaptive filters can be used by airborne pulsed-Doppler radars that have multiple spatial receive channels, such as phased-array Doppler radar. The radar receives signals from both external interference and the scattered energy of each transmitted pulse reflected from targets and clutter. Clutter, jamming, and other noise jointly comprise the interference component of the received signal. Each spatial channel receives the returned pulses independently. The variation in phase delay between received pulses in different spatial channels determines the direction from which the signal component arrives.

In general, adaptive filtering maximizes SINR by linearly combining complex-weighted pulses and/or spatial channel samples to adaptively suppress unwanted signal components. General information regarding adaptive radar may be found in L. E. Brennan and I. S. Reed, "Theory of Adaptive Radar", IEEE Trans. AES, Vol. AES-9, No. 2, pp. 237–252, March 1973, the disclosure of which is incorporated herein by reference.

The radar transmits a series of pulses. These pulses are reradiated back by interference and targets, received by multiple-channel receivers, sampled at discrete time intervals that correspond to each range cell, and stored in memory. The adaptive filter operates on the stored samples to remove interference that competes with the reflections from a target.

Pulse signals received by each channel of the multichannel radar receiver are sampled and stored in digital memory by pulse sample and channel sample for each range cell. A range cell is defined as half the width of the transmitted pulse times the speed of the pulse's propagation (assumed to be the speed of light: $3 \times 10^8$ meters per second).

To maximize the SINR of the received signals, the adaptive processor adjusts its complex filter weights to match the interference in a given range cell. The adaptive filter "learns" about the interference in the range cell by estimating the interference signal covariance for all possible combinations of pulses and/or channel signal samples. Processing signal samples from adjacent range cells leads to an estimate of the average interference covariance between pulses and/or channel signal samples for the desired range cell. The adaptive processor computes the filter weights directly from the estimated covariance of the pulse and channel signal samples for the given interference. The range cells that provide signal samples for estimating the covariance properties of the interference are called auxiliary cells; the range cells to be adaptively filtered, test cells. Since the adaptive filter operates on multidimensional signals in space and time, the term "covariance" implies the values of covariance among the appropriate combinations of pulse and/or channel signal samples.

As indicated above, the estimate of test cell interference covariance from auxiliary cells determines the adaptive filter weights. Test and auxiliary cells that display similar interference properties, and hence similar covariance, are homogeneous. One obtains acceptable estimates of interference covariance in homogeneous environments by averaging a sufficient number of arbitrarily chosen auxiliary signals. In this case, estimated signal covariance converges to its true value. Adaptive filter weights approach their ideal values in such cases as well, since the estimated covariance determines the filter weights. Thus adaptive filtering in homogeneous environments is nearly optimal.

However, the real airborne radar signal environment is not homogeneous, as has been determined at the United States Air Force's Rome Laboratory through extensive analysis of airborne radar data. A variety of factors make the environment nonhomogeneous in range, including clutter that varies spatially, moving scatterers, and deceptive jamming. In fact, the signal environment of an airborne platform can be as nonhomogeneous as the visual environment appears to an airborne observer who might see, e.g., mountains, lakes, forests, roads and vehicles, etc., from an aircraft window. These nonhomogeneities lead to severe degradation in the performance of adaptive filters, because nonhomogeneous signals exhibit dissimilar covariance. Thus nonhomogeneous environments cause problems for adaptive filtering.

The estimates of covariance obtained by averaging nonhomogeneous signals from auxiliary cells do not adequately represent the values of interference covariance in test cells. Adaptive filter weights computed directly from erroneous estimates of covariance of interference in test cells are severely degraded. More precisely, estimates of test cell interference covariance from nonhomogeneous auxiliary cells do not converge to the true covariance required to compute good adaptive filter weights. In such situations, excluding nonhomogeneous auxiliary cells from the estimation of covariance would enhance the performance of adaptive filtering.

Traditional approaches to adaptive filtering select auxiliary cells sequentially by range on the assumption that the environment is homogeneous. Only if this assumption is valid will an arbitrary selection of a sufficient quantity of auxiliary cells to estimate covariance lead to good adaptive filter performance. As, however, airborne radar environments are nonhomogeneous, this traditional approach is deficient. It does not account for the nonhomogeneous nature of the typical airborne environment.

Often a limited quantity of homogeneous auxiliary cells are interspersed with nonhomogeneous cells. Processing nonhomogeneous with homogeneous auxiliary cells, as in the traditional approach, damages the estimate of interference covariance and the adaptive filter weights that follow. Severe degradation of adaptive filter performance can result.

Thus it is desirable to detect and automatically remove nonhomogeneous cells when estimating the signal covariance from which one computes adaptive filter weights. Using only homogeneous auxiliary cells improves interference characterization for the majority of test cells. Covariance estimated exclusively from homogeneous auxiliary cells leads to adaptive filter weights that effectively cancel most interference, thereby greatly enhancing the adaptive filter. Thus the capacity to detect and remove nonhomogeneous auxiliary cells from the estimation process can make adaptive filtering feasible for operational use by airborne radar to improve the detection of weak targets masked by strong interference.

SUMMARY OF THE INVENTION

Briefly stated, the present invention discloses apparatus and method for improving detection of targets in a radar system that employs adaptive filtering. A nonhomogeneity detector eliminates nonhomogeneous signals from the population of signals received. An adaptive filter weight controller estimates covariance matrices from only homogenous signals. Thus the apparatus and method improves the probability of detecting the presence or absence of a target at the same time that it decreases the probability of a false alarm by improving the performance of an adaptive filter.

The present invention dramatically improves the performance of adaptive filtering in nonhomogeneous environments by detecting and excluding nonhomogeneous auxiliary signals from estimation of covariance and from adjustment of adaptive filter weights. Specifically, the present invention adds signal processing units that enhance current airborne radar adaptive filtering techniques in nonhomogeneous environments. The added signal processing units of the present invention provide the capacity to automatically: (1) analyze the covariance structure of auxiliary signals; (2) detect nonhomogeneous auxiliary cells; (3) exclude cells detected as nonhomogeneous from the estimate of interference covariance and the adjustment of adaptive filter weights. The improvement in adaptive filtering of the present invention yields increased SINR, thereby making more probable the detection of weak targets at a lower rate of false alarms. Analysis of measured multichannel airborne radar data demonstrates a dramatic improvement in adaptive filter performance from the present invention.

A nonhomogeneity detector and an auxiliary signal selector comprise the signal processing units added by the present invention. They overcome the deleterious effects of nonhomogeneous interference on adaptive filtering, thereby overcoming the drawbacks of current approaches to airborne adaptive filtering, as the latter assume the signal environment to be homogeneous in all cases.

Analysis of measured airborne radar signals from the United States Air Force Rome Laboratory Multichannel Airborne Radar Measurements ("MCARM") program shows the airborne radar signal environment to be severely nonhomogeneous. The nonhomogeneity detector and auxiliary signal selector of the present invention identify nonhomogeneous auxiliary signals and exclude them from the estimation of interference covariance. Improved estimates lead to higher SINR via better adaptive filter weight adjustment. Higher SINR leads to higher probability of detection with fewer false alarms.

Traditional adaptive filtering topologies select auxiliary signals for covariance estimation without prior processing to assess their suitability. These traditional methods assume auxiliary signals are approximately homogeneous. Under this assumption, one expects that consecutively selecting auxiliary signals in a range around the test cell leads to optimal performance. This approach is known as the symmetric window method of auxiliary signal selection. Other conventional methods select auxiliary signals in a similar ad hoc fashion. However, these conventional methods are inappropriate in the nonhomogeneous environments typically encountered by airborne radar. Added processing of auxiliary signals to identify and select the most homogeneous signals for covariance estimation enhances adaptive filtering performance.

The nonhomogeneity detector and auxiliary signal selector of the present invention screen and select appropriate homogeneous auxiliary signals. These additional signal processing units are inserted ahead of the adaptive filter weight controller in the adaptive filter signal processing chain. Available auxiliary signals enter the nonhomogeneity detector consecutively. The detector assesses the covariance of each auxiliary signal in relation to all other selected auxiliary signals and assigns a numerical value. Each numerical value categorizes the relative covariance of the corresponding auxiliary signal, including both phase and amplitude. An ordered pair, comprising the numerical nonhomogeneity detector output and the range cell index associated with this output, pass to the auxiliary signal selector. The auxiliary signal selector automatically selects the range cell indices that correspond to the most homogeneous auxiliary signals and stores them in a digital memory.

Homogeneous range cell indices then pass from the auxiliary signal selector to a conventional adaptive filter weight controller that estimates interference covariance from only the homogeneous range cell indices. Next, the adaptive filter weight controller computes the adaptive filter weights from the interference covariance estimates. These filter weights optimally cancel the homogeneous interference characterized by the covariance estimate computed from the homogeneous range cell indices. By definition, the homogeneous interference represents most of the interference. Thus adaptive filtering is improved by the present invention.

Analysis of measured airborne data from the MCARM program demonstrates a dramatic improvement in performance from the nonhomogeneity detection method and apparatus of the present invention. The present invention applies to all adaptive filtering topologies for airborne radar, and it can be applied to other areas of signal processing where the environment is similarly nonhomogeneous.

The above and other objects and advantages of the present invention will become apparent from the following description read in conjunction with the accompanying drawings, in which like reference numerals designate the same element.

DETAILED DESCRIPTION OF THE PREFERRED EMBODIMENT

Figure 1:
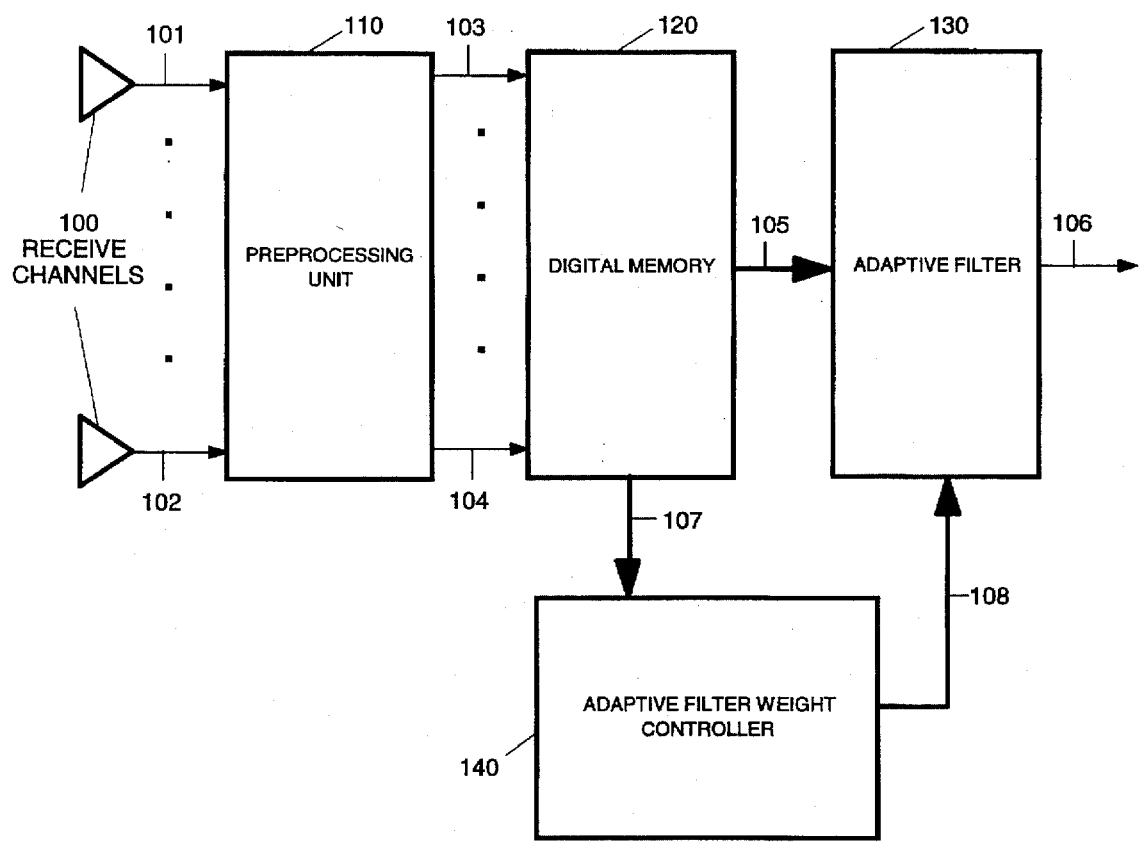
FIG. 1 is a block diagram of a prior-art adaptive filter for airborne radar.

The objective of an adaptive filtering system for airborne radar is to maximize SINR, thereby enhancing detection performance capability. FIG. 1 shows a classical adaptive filtering topology following standard digital signal processing of received multichannel airborne radar signals. A plurality of analog radar signals 101, 102 arrive at a plurality of receive channels 100. The received radar signals include target and clutter returns, together with additive uncorrelated interference called noise. Clutter returns are a correlated form of interference. A preprocessing unit 110 receives analog radar signals 101, 102, converts them to intermediate frequencies ("IF"), digitally samples them in analog-to-digital converters, and applies traditional radar signal processing to yield baseband frequency, complex-valued, digital in-phase-and-quadrature ("IQ") radar signal samples 103, 104 that correspond to each range cell for each transmitted pulse and receive channel. Radar signal samples 103, 104 can be expressed as $x_k(i,l)$, where $i=1, 2, \ldots, P$ and $l=1, 2, \ldots, M$, corresponding respectively to the pulse and channel number. Subscript k, refers to the $k^{th}$ of L discrete range cells. A digital memory 120 stores signal samples $x_k(i,l)$ for all P pulses, M channels, and L range cells. A composite vector signal $X_k$, representing all P pulse and M channel signal samples for the $k^{th}$ range cell, can be written, $$X_k = [x_k(1,1), x_k(1,2), \ldots, x_k(1,M), x_k(2,1), \ldots, x_k(2,M), \ldots, x_k(P,1), \ldots, x_k(P,M)]^T,$$

where superscript T indicates a vector transpose operation. Vector signal $X_k$ has a dimension P*M by 1. (Note: capitalized variables indicate vector quantities; lower case variables, scalar quantities.)

An adaptive filter 130 processes vector signal 105, expressed as $X_k$. Provided the filter weights are near-optimal, the adaptive filter suppresses the correlated interference component of $X_k$ while passing the signal component to the output. The output of the adaptive filter for range cell k is a scalar signal 106, referred to as $y_k$. Scalar signal 106 is computed as, $$y_k = W_k X_k,$$

where $$W_k = [w_k(1,1), w_k(1,2), \ldots, w_k(1,M), w_k(2,1), \ldots, w_k(2,M), \ldots, w_k(P,1), \ldots, w_k(P,M)]$$

is the adaptive weight vector of dimension 1 by P*M. Thus the $i^{th}$ pulse, $l^{th}$ channel sample, $x_k(i,l)$, is multiplied by the complex weight, $w_k(i,l)$. The adaptive filter linearly sums all weighted pulse and channel samples for the $k^{th}$ range cell to yield $y_k$.

The true, optimal weight vector, $\overline{W}_k$ that maximizes the SINR is:

$$\overline{W}_k = s^H \overline{R}k^{-1}; \overline{R}k = E[X_{k,l} X_{k,l}^H].$$

$X_{k,l}$ is $X_k$ under the null hypothesis, where only interference plus noise comprise $X_k$. Furthermore, $E[\cdot]$ is the expectation operator, $\overline{R}k$ is the true interference covariance matrix of size P*M by P*M, the superscript H indicates the conjugate transpose operation, and s is a user-specified steering vector. The elements of $\overline{R}k$ are the covariances between all possible combinations of chosen pulses and spatial channel samples.

A variety of reduced-dimension, suboptimal adaptive filters directly follow the two-dimensional adaptive filtering approach described above. Reduced-dimension architectures adaptively filter an altered version of the signal vector $X_k$, called $\tilde{X}_k$. For example, altered versions of the signal vector may result from Doppler processing prior to adaptive filtering. Except that $\tilde{X}_k$ replaces $X_k$, the formulation of the weights and adaptive filter output remain the same for these reduced-dimension approaches.

The present invention applies to all forms of adaptive filtering for airborne radar, including reduced-dimension architectures. In general, the reduced-dimension case is dealt with by replacing the full-dimension signal vector, $X_k$, with the reduced-dimension signal vector, $\tilde{X}_k$, and accounting for the difference in vector lengths.

In practice, the true interference covariances, represented by the interference covariance matrix $\overline{R}k$, are never known. They must be estimated from the auxiliary signals taken from range cells other than the test cells. Thus a multiple of auxiliary signal vectors 107 enter an adaptive filter weight controller 140. Adaptive filter weight controller 140 forms the outer product of a selected auxiliary signal vector, $X_i$ (or $\tilde{X}_i$ in the reduced-dimension case). The outer product is a matrix computed as $X_i X_i^H$ (or $\tilde{X}_i \tilde{X}_i^H$ in the reduced-dimension case) from the $i^{th}$ auxiliary signal vector 107. Next, adaptive filter weight controller 140 averages K outer product matrices computed from the K auxiliary signal vectors 107 to arrive at the interference covariance matrix estimate, $$R_k = \frac{1}{K} \sum_i X_i X_i^H.$$

Adaptive filter weight controller 140 multiplies the inverse of the interference covariance matrix estimate by the user-specified steering vector, s, to arrive at an adaptive weight vector 108, expressed as $W_k$. The adaptive filter uses adaptive weight vector 108 to process the test cell signal vector 105. The adaptive weights, $W_k$, computed directly from the interference covariance matrix estimate, $R_k$, estimate the optimal weights, $\overline{W}_k$, required to maximize the SINR for the $k^{th}$ range cell.

If the environment be homogeneous, auxiliary signal vectors can come from range cells adjacent to the test cells without regard to the nature of these auxiliary signals. For example, a common approach is the symmetric window method, where the K/2 adjacent range cells on either side of a given test cell provide auxiliary signal vectors 107 required for covariance matrix estimation. It is common practice to exclude as auxiliary range cells several guard cells on either side of the test cell to prevent leakage of potential target signal energy into the covariance matrix estimates. When the environment is homogeneous, the K auxiliary signals satisfy the necessary condition of appearing independent and identically distributed ("iid") to the interference in the test cell. In such homogeneous scenarios, K should equal at least twice the length of $X_k$ (or, $X_k$).

Thus adaptive filter weight controller 140 merely selects K=2*P*M (or twice the length of $X_k$ in the reduced-dimension case) auxiliary signal vectors 107 to compute the interference covariance estimate in homogeneous environments. Variations of the symmetric window method of selecting auxiliary cells exist for cases where the interference covariances are homogeneous. These alternative methods similarly involve ad hoc selection of blocks of range cells to estimate covariance. However, the preferred approach is the symmetric window method, since it generally accounts for variation of auxiliary signal vectors 107 over extended range intervals.

These classical (i.e., prior art) approaches for selecting auxiliary signals from which to estimate the interference covariance matrix assume homogeneous environments. Analysis of measured airborne radar data from MCARM indicates that typical airborne radar environments can be very nonhomogeneous. Nonhomogeneous environments degrade adaptive filter performance through erroneous estimates of interference covariance that lead to incorrect adaptive filter weight adjustment.

Figure 2:
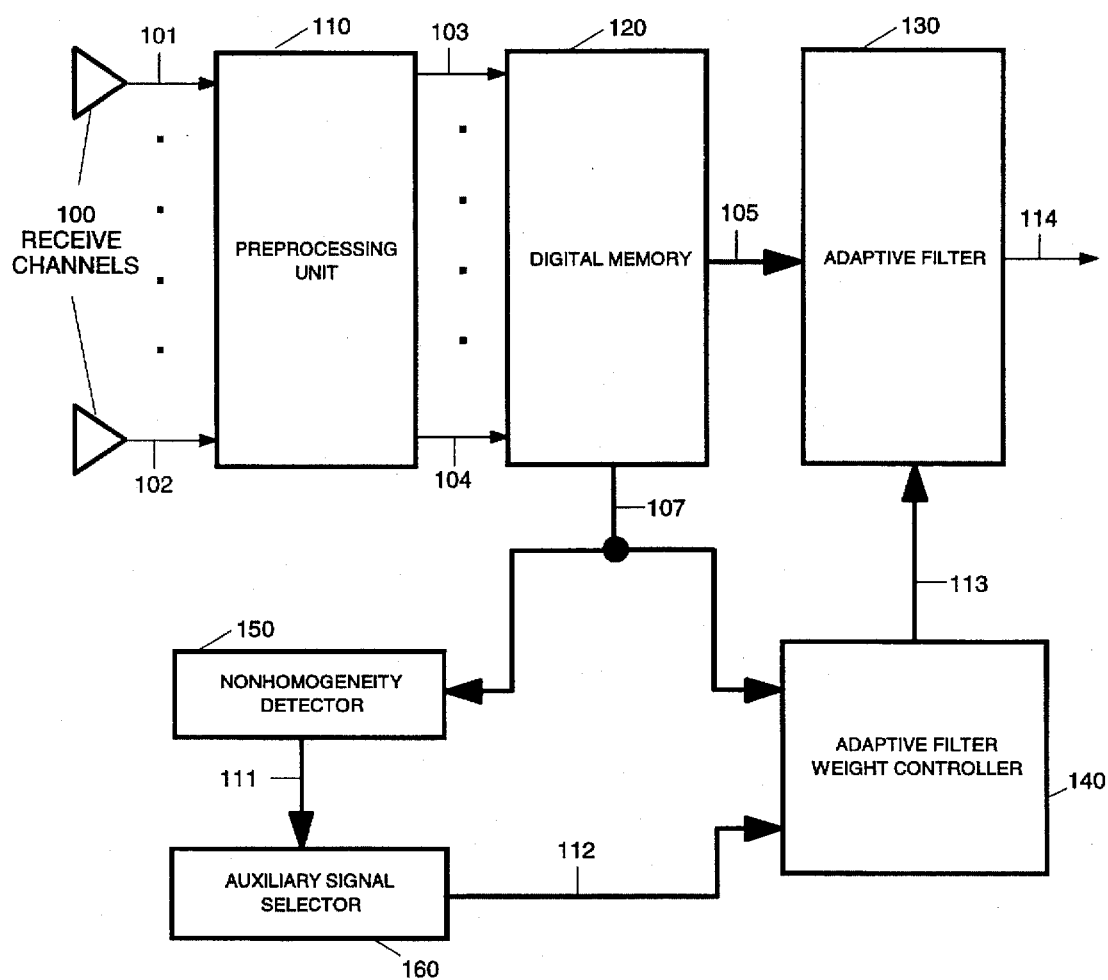
FIG. 2 is a simplified block diagram of the nonhomogeneity detection apparatus and method of the present invention, incorporated within an adaptive filter.

FIG. 2 shows the basic structure of an adaptive filter that incorporates the nonhomogeneity detection apparatus and method of the present invention to improve estimates of interference covariance matrices and adjustments of adaptive filter weight in nonhomogeneous environments. Unlike the prior-art approach shown in FIG. 1, auxiliary signal vectors 107 enter a nonhomogeneity detector 150. Nonhomogeneity detector 150 processes an auxiliary signal vector, $X_i$ (or $X_i$ in the reduced-dimension case), to assess its covariance structure with respect to other available auxiliary signal vectors, $X_j$ (or $X_j$ in the reduced-dimension case). A buffer (not shown) within nonhomogeneity detector 150 accumulates the numerical values, $z_i$, corresponding to the nonhomogeneity assessment of each auxiliary signal vector 107, $X_i$ (or $X_i$). Also, the buffer stores the corresponding range index of the $i^{th}$ auxiliary signal vector 107 with its numerical nonhomogeneity assessment. Thus the buffer actually stores the ordered pair, [$z_i$,i]. See below for more detail about nonhomogeneity detector 150, including the computation and significance of $z_i$.

The buffer within nonhomogeneity detector 150 passes to an auxiliary signal selector 160 a vector 111 that contains the stored ordered pairs [$z_i$,i]. A sorter within auxiliary signal selector 160 ranks all ordered pairs [$z_i$, i] contained in vector 111 in ascending order of magnitude of $z_i$. An auxiliary signal $X_i$ (or $X_i$) is nonhomogeneous with respect to surrounding available auxiliary signals $X_j$ (or $X_j$) if $z_i$ differs considerably in magnitude from the $z_j$ computed for the majority of the other auxiliary signals. Auxiliary signal selector 160 computes from the ranked $z_i$ high and low thresholds that distinguish nonhomogeneous from homogeneous auxiliary signals.

After computing the thresholds, auxiliary signal selector 160 stores the range indices that correspond to those homogeneous auxiliary range cells, identified by $z_i$, with magnitudes between the high and low thresholds. A vector 112 of homogeneous range indices is passed from auxiliary signal selector 160 to adaptive filter weight controller 140. Adaptive filter weight controller 140 uses the homogeneous auxiliary range indices stored in vector 112 to estimate the interference covariance matrix and compute the adaptive filter weight vector suitable for canceling the homogeneous interference over a selected range interval. By definition, the homogeneous interference represents the majority. Thus adaptive filter performance is improved in most instances. Measured data results presented below demonstrate the superior performance of this invention over the classical symmetric window approach of the prior art.

Figure 3:
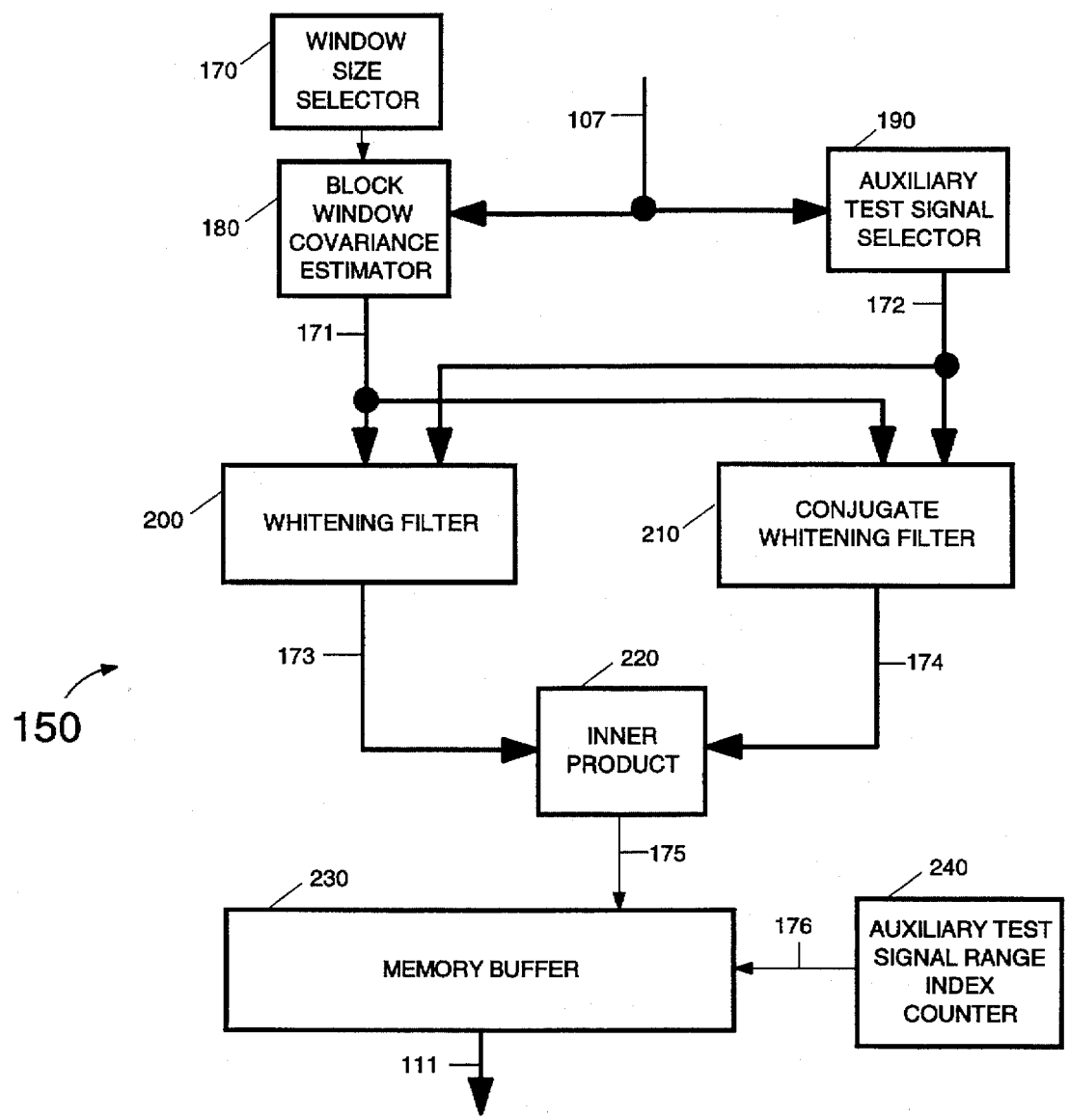
FIG. 3 is a block diagram of a preferred embodiment of the nonhomogeneity detector of the present invention.

FIG. 3 shows nonhomogeneity detector 150 in detail. A window size selector 170 identifies the number K of auxiliary signal vectors from which to estimate interference covariance matrices. Nominally, this number is set to twice the length of auxiliary signal vector 107 (e.g., K=2*P*M for $X_i$). A block window covariance estimator 180 ("BWCE") computes a first-pass estimate of the interference covariance in user-specified range intervals for an auxiliary signal, $X_i$. This signal is identified by an auxiliary test signal selector 190.

The estimate of block window covariance can be performed in at least two ways. In the first, BWCE 180 forms a covariance matrix estimate, $R_i$, for each signal vector, $X_i$, throughout the specified range interval containing both auxiliary cells and test cells. (Note that a test cell can be an auxiliary cell for another test cell). In the first pass, the $i^{th}$ covariance matrix is estimated for the $i^{th}$ signal vector by the symmetric window method. Thus BWCE 180 sums the outer product matrices, $X_j X_j^H$, for K/2 adjacent range cells on both sides of $X_i$, excluding guard cells, and scales the result by 1/K. In the second approach, BWCE 180 forms a single covariance estimate, $R_{region}$, for all K auxiliary and test cells throughout the specified range by summing the outer product matrices for each signal vector and scaling the result by 1/K. Without loss of generality, the remainder of the discussion assumes the first BWCE approach of estimating a covariance matrix for each individual signal vector.

A BWCE covariance estimate 171, $R_i$, and a selected auxiliary vector 172, $X_i$, simultaneously enter a whitening filter 200 and a conjugate whitening filter 210. Whitening filter 200 computes a signal vector 173, $z1_i = R_i^{-\frac{1}{2}} X_i$.

Conjugate whitening filter 210 computes a signal vector 174, $z2_i = X_i^H R_i^{-\frac{1}{2}} = z1_i^H$.

(Note that $R_i$ is a hermitian matrix). Signal vectors 173 and 174 enter a block performing an inner product 220, whose output 175 is given as, $z_i = z2_i z1_i = X_i^H R_i^{-\frac{1}{2}} R_i^{-\frac{1}{2}} X_i = X_i^H R_i^{-1} X_i$.

Figure 4:
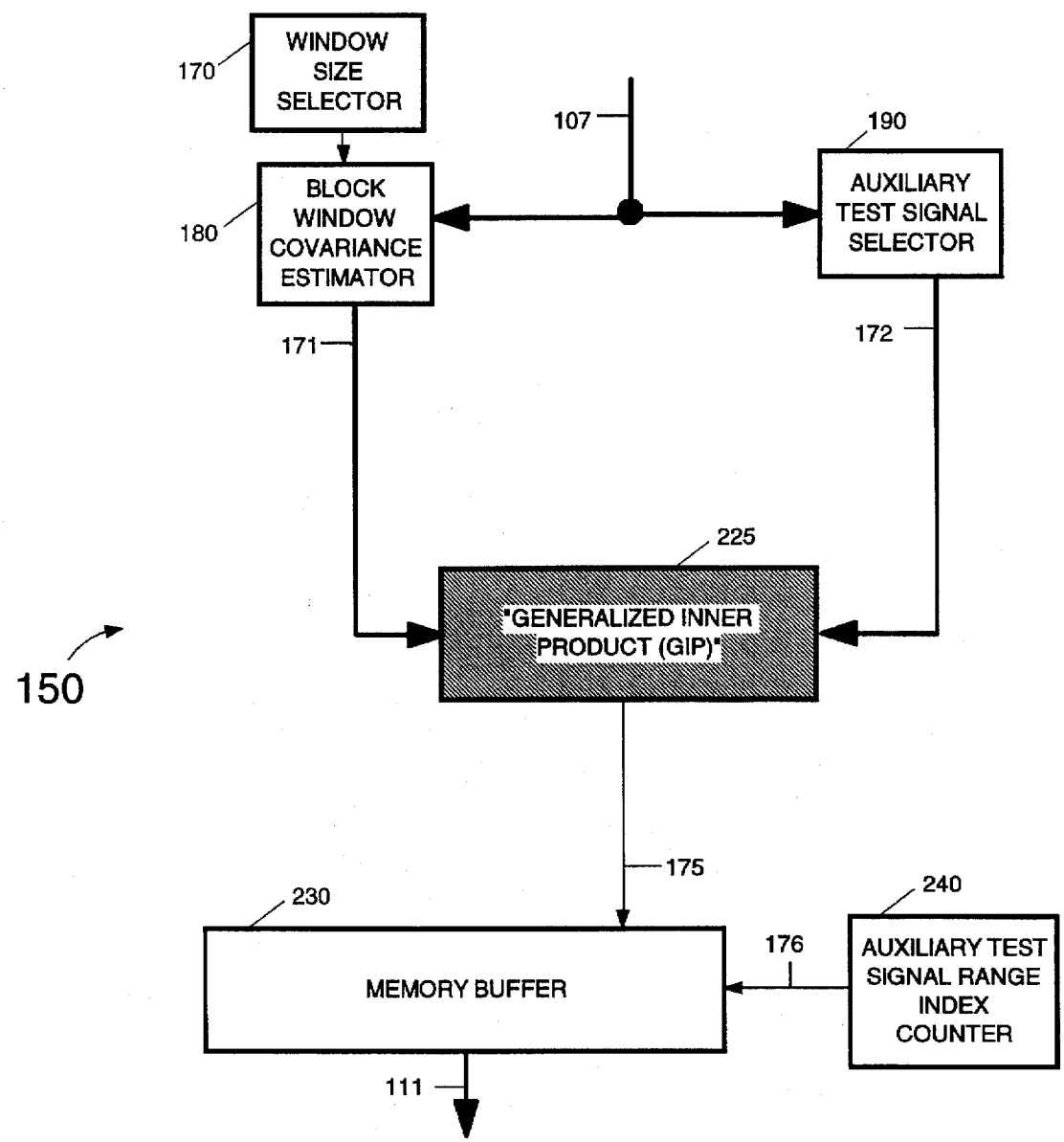
FIG. 4 is an equivalent block diagram of a preferred embodiment of the nonhomogeneity detector of the present invention.

FIG. 4 shows another embodiment of non-homogeneity detector 150. Whitening filter 200, conjugate whitening filter 210, and inner product 220 can be replaced by a single block directly computing, $z_i = X_i^H R_i^{-1} X_i$.

This single block is a Generalized Inner Product ("GIP") 225. However, FIG. 3's use of whitening filter 200, conjugate whitening filter 210, and inner product 220 (as opposed to the mathematically equivalent GIP 225) shows more clearly the physical insight that leads to selecting $z_i$ as a test of nonhomogeneity. GIP 225, on the other hand, is more convenient for theoretical statistical analysis and derivation. Thus FIG. 4 is an equivalent, simplified version of FIG. 3, leading from a computational point of view to a more efficient realization. Output 175 is the same in both FIG. 3 and FIG. 4.

The nonhomogeneity test signal, $z_i$, equivalent to the output of GIP 225, measures the covariance of the auxiliary signal vector $X_i$ in relation to the surrounding auxiliary signals used to estimate the first-pass covariance matrix, $R_i$. The latter is the inner product of signal vectors 173, 174, the filtered signal vector $z1_i$, and its conjugate transpose $z2_i$. The matrix $R_i^{-1/2}$ provides filtering for both whitening and conjugate whitening filters.

Provided $R_i$ is a good estimate of the true covariance matrix $\bar{R}_1$, signal vectors 173, $z1_i$, and 174, $z2_i$, appear as decorrelated versions of $X_i$, normalized to unity power per element. Specifically, the covariance matrix of signal vectors $z1_i$ and $z2_i$ is $$R_{z_i} = E[z1_i z1_i^H] = E[z2_i^H z2_i] = R_i^{-1/2} E[X_i X_i^H] R_i^{-1/2} = R_i^{-1/2} \bar{R}_i R_i^{-1/2}$$

If $R_i$ is a good estimate of the true covariance matrix $\bar{R}i$ of auxiliary signal $X_i$, then $R_{z_i} \cong I$, where I is the appropriately dimensioned identity matrix. Hence whitening filter 200 decorrelates the input auxiliary signal vector $X_i$, when $R_i$ closely approximates $\bar{R}_i$. Signal vectors decorrelated by whitening filter 200 appear similar to white noise vectors (hence the nomenclature, "whitening filter"). If the true covariance matrix of auxiliary signal vector $X_i$ is not matched to the covariance estimate $R_i$, the elements comprising signal vectors 173, 174 remain correlated.

Output 175, $z_i$, is the inner product of $z1_i$ and $z2_i$. Since $z2_i = z1_i^H$, this inner product is a measure of the power in either signal vector 173 or 174. In other words, $$z_i = z2_i z1_i = z1_i^H z1_i = |z1_i|^2 = |z2_i|^2.$$

Thus $z_i$ is equivalent to the sum of the squares of the elements comprising $z1_i$ or $z2_i$, which is the total power in either vector $z1_i$ or $z2_i$. Whitening filter 200 not only decorrelates an auxiliary signal vector $X_i$, whose true covariance matrix is similar to $R_i$. It also normalizes the power per element of the whitened signal vector to unity, as shown by the diagonal-only entries of unity value when $R_{z_i} \cong I$. Unwhitened, correlated signal vectors passing through whitening filter 200 demonstrate a significantly different power per element weighting than unity, while partially whitened signal vectors demonstrate power per element values near unity. Auxiliary signals with similar covariance will demonstrate similar values of $z_i$ because of whitening filter 200. Thus the power per element of either signal vector 173 or 174, noncoherently summed to yield $z_i$, distinguishes homogeneous auxiliary signals from nonhomogeneous signals. Nonhomogeneous auxiliary signals demonstrate values of $z_i$ either significantly greater or less than average.

Reinforcing the preceding physical analysis, mathematical analysis supports selection of $z_i$ as a nonhomogeneity detector. In the framework of statistical ranking and selection theory, it appears that $z_i$ or the output of GIP 225 can be a selection statistic for screening auxiliary data with a well-defined confidence level of correct selection for specific problems.

GIP 225 assesses covariance, including both amplitude and phase information, by computing the power of whitened signal vectors $z1_i$ or $z2_i$. Evaluating the output of GIP 225 is thus significantly different from evaluating fluctuations in interference power of the raw radar data, $X_i$. The power of whitened signal vectors $z1_i$ or $z2_i$ characterizes both amplitude and phase of the selected auxiliary signal, since whitening filter 200 adjusts the power per element of the raw signal as a function of its homogeneity with other available signals. Signals with dissimilar covariance lead to partially whitened signal vectors with power either greater or less than average, as described above. A strict power assessment of the raw data, such as $X_i^H X_i$, only characterizes amplitude variation. It may be suitable for constant false alarm rate ("CFAR") detection, since amplitude variability is the only concern of such detection. However, a power assessment suitable for CFAR is inappropriate to determine nonhomogeneity for adaptive filtering because of the lack of phase information, a critical aspect of covariance structure. Characterizing covariance structure is crucial to proper estimates of interference covariance and adjustments to the adaptive filter weights.

Figure 5:
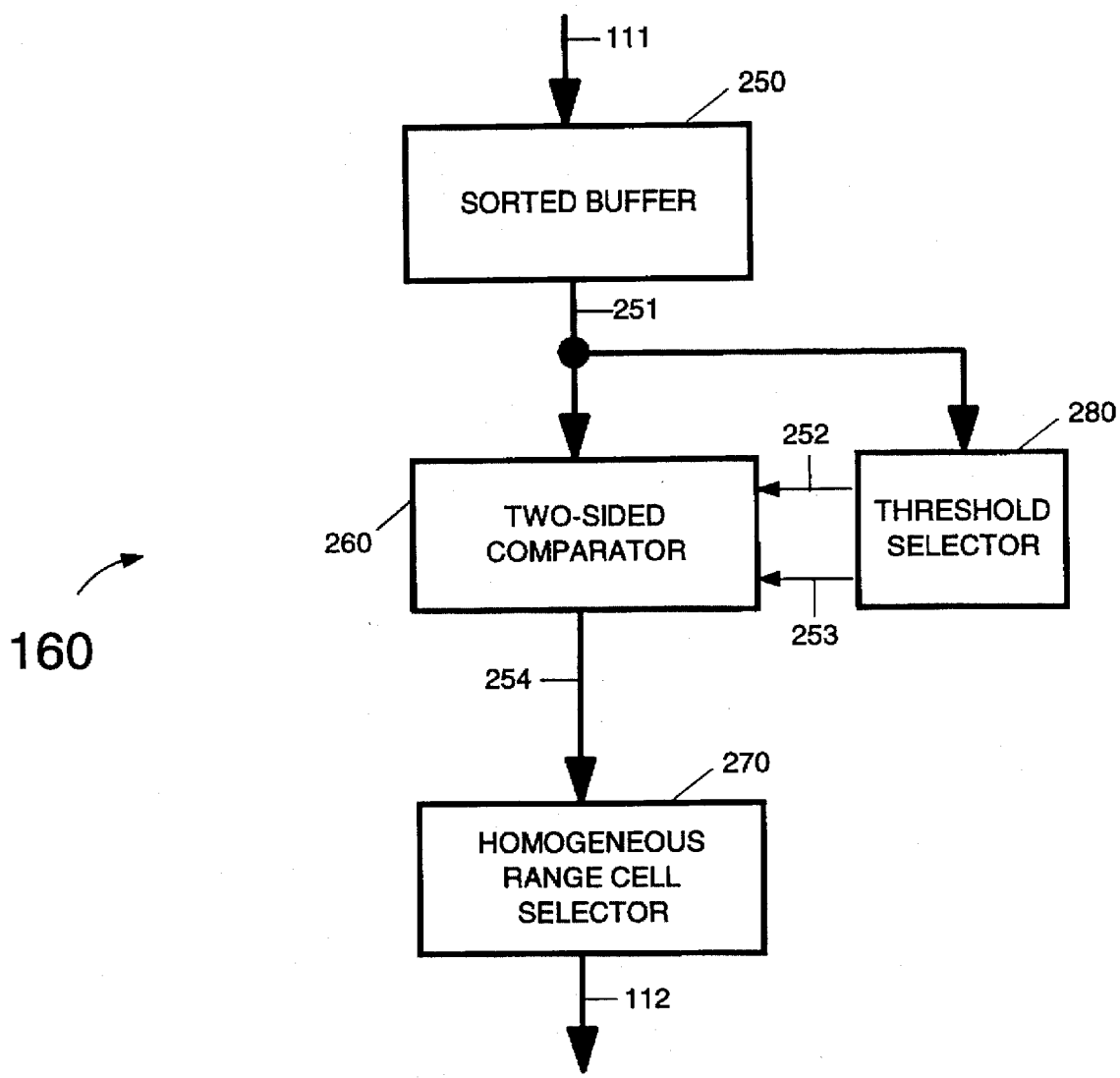
FIG. 5 is a block diagram of a preferred embodiment of the auxiliary signal selector of the present invention.

As discussed above, FIGS. 3 and 4 are equivalent embodiments of nonhomogeneity detector 150 shown in FIG. 2. Similarly, FIG. 5 shows a preferred embodiment of auxiliary signal selector 160 also shown in FIG. 2.

Referring to FIGS. 2–5, a memory buffer 230 stores output 175, $z_i$, from the section of nonhomogeneity detector 150 identified in FIG. 3 as inner product 220 and in FIG. 4 as GIP 225, together with a corresponding range cell index 176 from an auxiliary test signal range index counter 240, as an ordered pair $[z_i, i]$. Memory buffer 230 then dumps its contents into auxiliary signal selector 160. Vector 111, comprised of all ordered pairs $[z_i, i]$ for all range indices of interest, enters a sorted buffer 250. Sorted buffer 250 ranks all ordered pairs $[z_i, i]$ contained in vector 111 in ascending order of the magnitude of $z_i$ and stores the result in a sorted vector 251. Sorted vector 251 simultaneously enters a threshold selector 280 and a two-sided comparator 260. Two-sided comparator 260 outputs a range index 254 for each $z_i$ value between a high threshold 252 and a low threshold 253. Threshold 252, 253 values are determined by threshold selector 280. A value of $z_i$ between high threshold 252 and low threshold 253 is homogeneous. A homogeneous range cell selector 270 stores each individual homogeneous range index as vector 112. Vector 112 of homogeneous range indices is passed from auxiliary signal selector 160 to adaptive filter weight controller 140. Adaptive filter weight controller 140 uses the homogeneous auxiliary signal vectors, identified by the range indices stored in vector 112, to compute an estimate of the interference covariance matrix. This estimate is then used to compute adaptive filter weights to effectively cancel homogeneous interference over a selected range interval.

Figure 6:
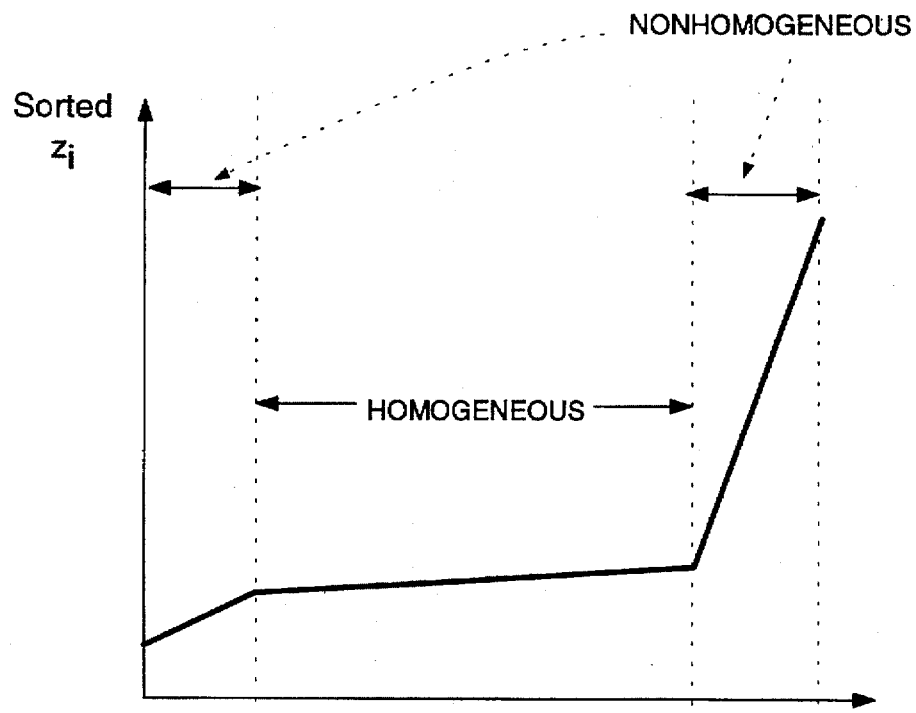
FIG. 6(A) is a graph showing the sorted output of the nonhomogeneity detector.
FIG. 6(B) is a graph showing the first derivative of the sorted output of the nonhomogeneity detector shown in FIG. 6(A).
Figure 6:
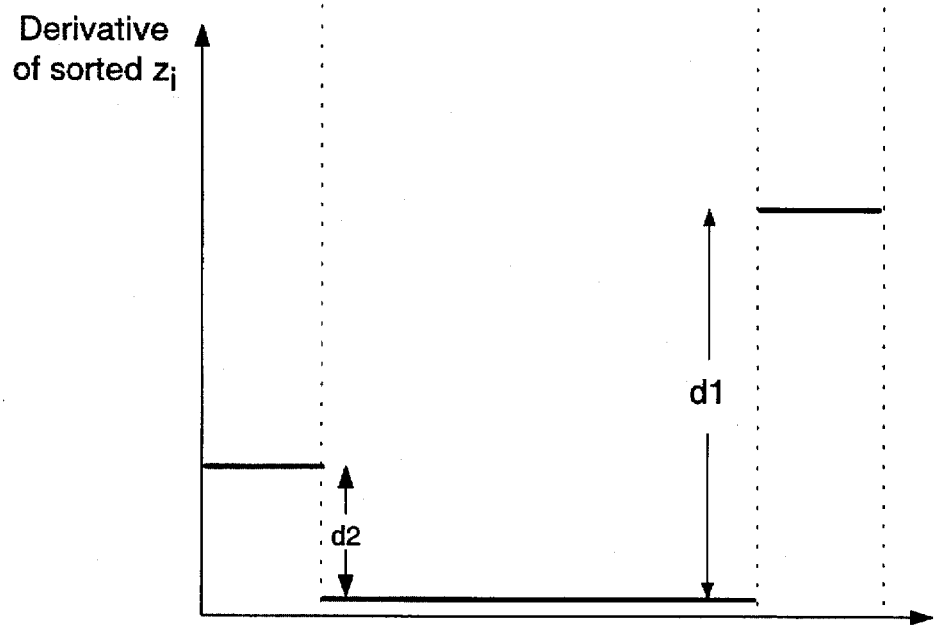

FIGS. 6(A) and 6(B) show an idealized plot of the sorted $z_i$ and its first derivative. Three distinct areas in FIG. 6(A) distinguish homogeneous and nonhomogeneous regions. A gradual difference between sorted $z_i$ of very similar values identifies the homogeneous region. The majority of auxiliary signals fall within this homogeneous region. Nonhomogeneous auxiliary signals demonstrate values of $z_i$ markedly different from the majority. Also, the difference between consecutive values of $z_i$ in nonhomogeneous regions varies much more than in homogeneous regions. Thus the rate of change between consecutive values of $z_i$, given by the first derivative shown in FIG. 6(B), is one choice for distinguishing homogeneous from nonhomogeneous auxiliary signals. A detector determining the point where the slope jumps by a value d1 (as shown in FIG. 6(B)) pinpoints the high end of the homogeneous region. Similarly, a second detector determining the point where the slope jumps by a lesser value, d2, at smaller values of rank number, indicates the low end of the homogeneous region.

The preceding view of the sorted values of $z_i$ leads to a practical threshold selector 280. An alternative threshold selector 280 chooses values about the median of the sorted $z_i$ on the assumption that the median lies near the middle of the homogeneous region.

Figure 7:
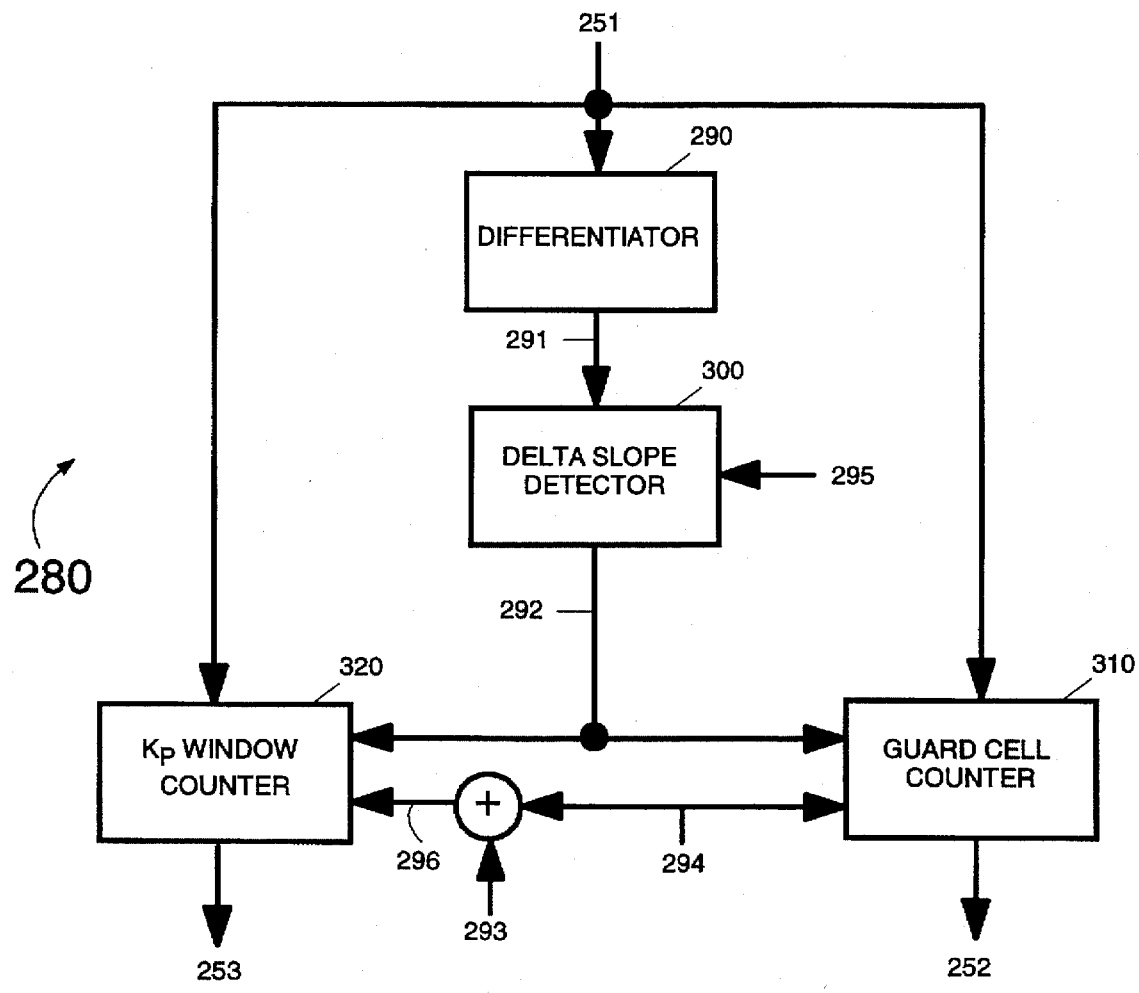
FIG. 7 is a block diagram of a preferred embodiment of a threshold selector that identifies homogeneous range cells in the present invention.

FIG. 7 shows a preferred embodiment for threshold selector 280. Threshold selector 280 automatically determines high and low thresholds 252, 253 that exclude nonhomogeneous auxiliary ranges from estimates of interference covariance. The elements of sorted vector 251 enter a differentiator 290 in consecutive rank order from lowest to highest. The output 291 of differentiator 290 enters a delta slope detector 300. Delta slope detector 300 searches for a change (or delta) in the slope associated with higher rank numbers. A delta value 295 is user-specified. The slope in the homogeneous region is very gradual, with very small first derivatives. A significant change in slope, greater than delta value 295 and towards the high end of sorted $z_i$ values, identifies the point where homogeneous and nohomogeneous regions abut. The rank number corresponding to this point of significant change in slope, $ir_{HI}$, passes as signal 292, to a guard cell counter 310 and a $K_p$ window counter 320. Sorted vector 251 also enters guard cell counter 310 and $K_p$ window counter 320 in the same manner it enters differentiator 290. A user-specified number of guard cells, $i_G$, identified as signal 294, likewise enters guard cell counter 310. Guard cell counter 310 computes a highest rank number, $i_{max}$, that corresponds to the highest value of $z_i$ representing a homogeneous auxiliary signal, as $i_{max} = ir_{HI} - i_G$. Next, guard cell counter 310 locates $z_{i_{max}}$, the numerical value of $z_i$ associated with $i_{max}$ contained within sorted vector 251, and outputs this value as high threshold value 252. A user-specified number of auxiliary range cells, $K_p$, identified as signal 293, sums with signal 294 to yield signal 296, which enters $K_p$ window counter 320. $K_p$ window counter 320 computes a lowest rank number, $i_{min}$, corresponding to the lowest acceptable value of $z_i$ representing a homogeneous auxiliary signal, as $i_{min} = ir_{HI} - (i_G + K_p)$. $K_p$ window counter 320 outputs low threshold value 253, $z_{i_{min}}$, equal to the numerical value of $z_i$ associated with $i_{min}$ contained within sorted vector 251. Auxiliary signal selector 160 uses high and low threshold values 252 and 253 to select via two-sided comparator 260 all range indices corresponding to homogeneous auxiliary signals.

Figure 8:
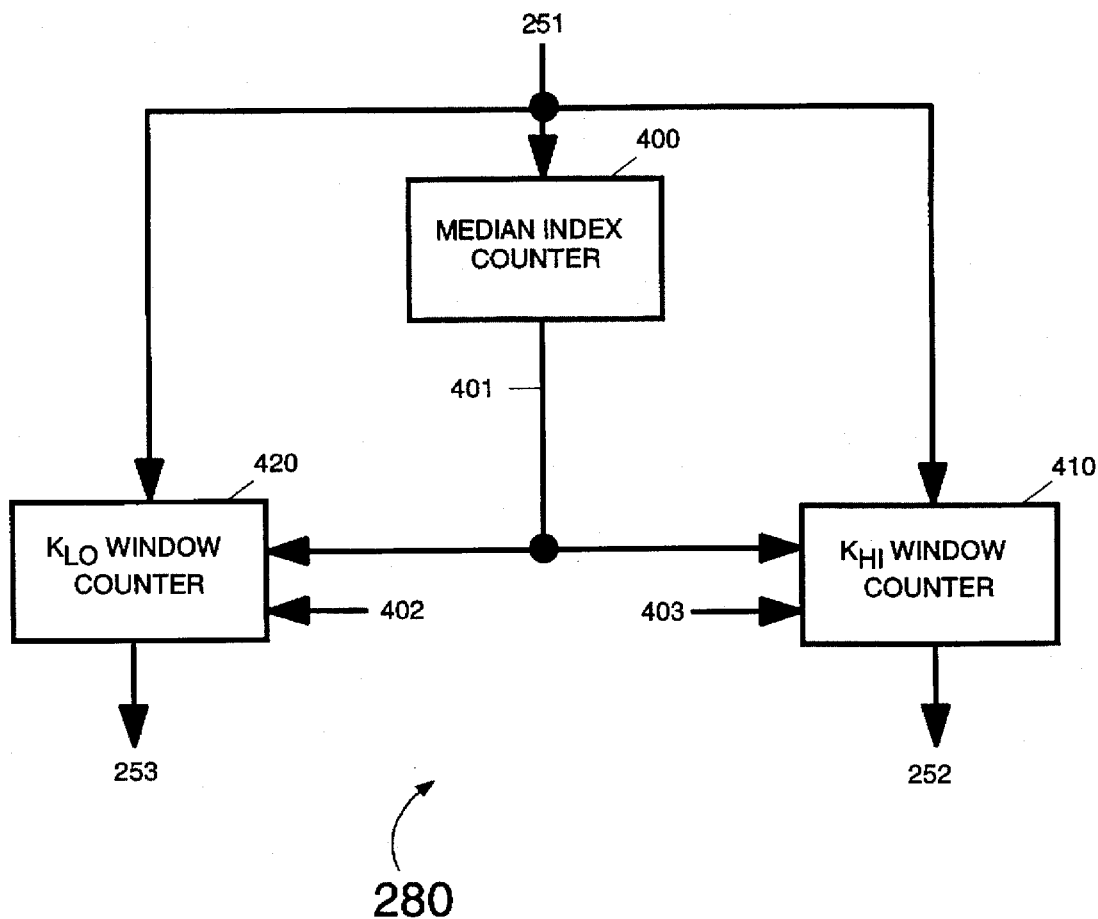
FIG. 8 is an alternative embodiment for the threshold selector of FIG. 7.

FIG. 8 shows another embodiment for threshold selector 280. Sorted vector 251 enters a median index counter 400 in consecutive rank order from lowest to highest. Median index counter 400 determines the median range cell index of the ranked range indices stored in sorted vector 251. A median range cell index 401 passes from median index counter 400 to a $K_{HI}$ window counter 410 and a $K_{LO}$ window counter 420. Sorted vector 251 also enters $K_{HI}$ window counter 410 and $K_{LO}$ window counter 420 in the same manner it enters median index counter 400. A user-specified high-end window length 403 enters $K_{HI}$ window counter 410. $K_{HI}$ window counter 410 determines the index of the ranked range cells stored in sorted vector 251 appearing a high-end window length number of units from median range cell index 401. High threshold 252 is set to the value of $z_i$ associated with this high index. Similarly, a user-specified low-end window length 402 enters $K_{LO}$ window counter 420. $K_{LO}$ window counter 420 determines the index of the ranked range cells stored in sorted vector 251 appearing a low-end window length number of units from median range cell index 401. Then low threshold 253 is set to the value of $z_i$ associated with this low index. FIG. 7 shows the preferred embodiment for threshold selector 280; FIG. 8 is simpler.

The above disclosure demonstrates the segmentation of signals into two groups, homogeneous and nonhomogeneous in the examples given, and the formation of an adaptive filter based on one only of those groups. This technique can be generalized to separate, based on covariance, a plurality of signals into more than two groups. Such a multidimensional separation would enable the processing of more complex images.

The preferred method of implementing the nonhomogeneity detector and auxiliary signal selector of the present invention is to program general-purpose digital signal processors ("DSPs") to carry out in real time the computational steps presented above. Alternatively one can custom-build Application-Specific Integrated Circuits ("ASICs") that perform the same computations in hardware. Thus the apparatus and methods of the present invention are interchangeable. General-purpose DSPs can readily implement the specific signal processing functions of the nonhomogeneity detector and auxiliary signal selector. Implementation of the adaptive filter in hardware would also require DSPs. Therefore the nonhomogeneity detector and auxiliary signal selector of the present invention and the adaptive filter associated therewith may be implemented either by custom circuits or by programming general-purpose computing hardware.

AIRBORNE MEASURED DATA ANALYSIS AND RESULTS

The advantages of the present invention can be demonstrated by comparing the performance of the prior art adaptive filter of FIG. 1 and the adaptive filter incorporating the nonhomogeneity detection method and system of FIG. 2. The comparison uses measured airborne radar data from the United States Air Force Rome Laboratory Multichannel Airborne Radar Measurements (MCARM) program. In a single coherent processing interval (CPI) from flight 5, acquisition number 575, a synthetic target is injected into the data at range cell 290, Doppler bin ten, zero degrees azimuth (boresight). This specific example demonstrates superior detection performance when the nonhomogeneity detection method and apparatus of the present invention augments an adaptive filter of the prior art.

The MCARM test bed is a British Aerospace Corporation ("BAC") 1-11 aircraft with a side-mounted, pulsed Doppler, phased array antenna. Twenty-two independent spatial channels, configured as eleven subarrays over eleven subarrays, comprise the receive aperture. Digital recorders connected to the output of twenty-two analog-to-digital ("A/D") converters store the received radar signal for each channel and pulse on a magnetic tape. The recorded radar data is at an intermediate frequency ("IF") centered at 1.25 megahertz, with 0.8 megahertz of bandwidth and a 50.4 microsecond linear frequency modulation for pulse compression. The A/D converters sample the received signal at 5 MHz. Acquisition 575 of flight 5 used a medium pulse repetition frequency ("PRF") of 2 kilohertz. A total of 128 recorded pulses and 630 unambiguous range cells are stored on the magnetic tape. Preprocessing unit 110 (see FIGS. 1 and 2) operates on the IF sampled data from the magnetic tape, performing baseband and digital I/Q conversion, pulse compression, and channel balancing to yield signal samples $x_k(i,l)$ that correspond to the $i^{th}$ pulse, $l^{th}$ channel, and $k^{th}$ range cell. Digital memory 120 stores these signal samples.

This comparison uses a reduced-dimension adaptive filter architecture called Factored Time-Space ("FTS") architecture. The large number of pulses recorded in each MCARM CPI translates to fine Doppler resolution, making FTS architecture a reasonable selection. FTS architecture requires independent Doppler processing of the twenty-two spatial channels of the MCARM sensor, followed by adaptive filtering of each Doppler bin. Thus FTS is a post-Doppler, adaptive spatial filtering technique. A 128-point fast Fourier transform ("FFT"), with a Hanning window function, applied to the 128 pulses for each individual channel yields 128 Doppler-filtered outputs. Thus the Hanning-weighted FFT modifies the data stored in digital memory 120 by replacing each pulse sample with a Doppler filter output. In other words, $x_k(i,l)$ is replaced by $\overline{\overline{x}}_k(i,l)$, corresponding to the $i^{th}$ Doppler filter output, $l^{th}$ channel, and $k^{th}$ range cell. Adaptive filtering is applied to the reduced-dimension vector $X_k(i)$, which is comprised of the twenty-two independent spatial channel samples for the $i^{th}$ Doppler and $k^{th}$ range cell.

First consider the FTS adaptive filtering implementation that corresponds to the prior-art apparatus of FIG. 1. Adaptive filter weight controller 140 forms the adaptive weights for each test cell and Doppler filter from the interference covariance matrix estimate. In this prior-art approach, a symmetric window selects the K/2 range cells about the test cell to estimate the interference covariance matrix of the auxiliary signals within each Doppler filter. Adaptive filter weight controller 140 places two guard cells on either side of the test cell prior to applying the symmetric window. A nominal value for K is forty-four (44) homogeneous, independent and identically distributed, auxiliary range cells. This value of K is twice the length of $X_{k(i)}$. A fundamental assumption of the symmetric window method of auxiliary signal selection is that all auxiliary signals appear homogeneous in range.

On the other hand, the FTS adaptive filter implementation shown in FIG. 2 employs the nonhomogeneity detection method and apparatus of the present invention to process available auxiliary signals and selects only those K auxiliary signals specifically determined to be homogeneous. This analysis employs the preferred threshold selector of FIG. 7 rather than the alternative threshold selector of FIG. 8. Vector 112 of length K, comprised of the homogeneous range cell indices, passes to adaptive filter weight controller 140. Adaptive filter weight controller 140 computes a covariance matrix estimate using the homogeneous auxiliary signals identified by vector 112. From this covariance estimate, adaptive filter weight controller 140 formulates adaptive filter weights.

Generally, the weights remain the same for all test cells in a given region. A slight adjustment of the weights occurs if vector 112 includes either the current test cell or its two guard cells on either side. Adaptive filter weight controller 140 automatically excludes these range cells from covariance matrix estimation, replacing them with other homogeneous auxiliary signals if available.

To effectively compare detection performance of the FTS algorithm with and without the nonhomogeneity detection method and apparatus, the adaptive filter includes an embedded CFAR characteristic achieved by a simple normalization of the filter weights. Normalizing the adaptive filter weights, $w_k(i,l)$, by the scalar $(s^H R_k^{-1} s)^{-1/2}$ leads to detection capability with a constant probability of false alarm over a range that is independent of the selected detection threshold. Thus a fixed threshold applied to the modified filter output over a selected range interval results in a constant false alarm rate. Use of the embedded CFAR modification greatly aids the analysis, since both probability of detection and probability of false alarm form a meaningful basis for comparing detection performance potential of the adaptive filters.

Figure 9:
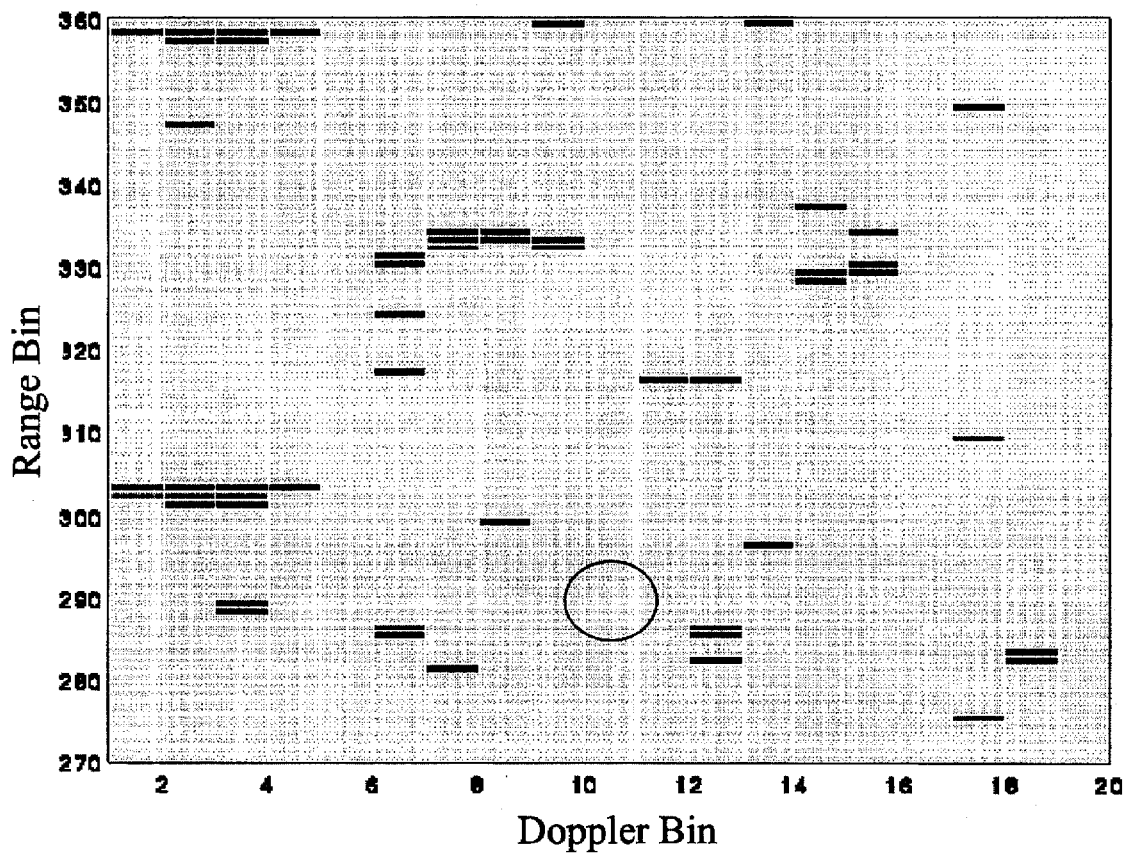
FIG. 9 is a chart that shows detection results for symmetric windowed adaptive filtering of the prior art using MCARM data from flight 5, acquisition 575.

FIG. 9 shows the detection performance results for the prior-art FTS architecture employing the symmetric windowing method for covariance estimation. In this case, the horizontal axis corresponds to Doppler bin number and the vertical axis to range cell number. A 20 dB threshold is applied to the adaptive filter output for all desired test range cells and Doppler bins. Signals crossing the threshold, depicted as white boxes, are either targets or false alarms. For clarity, FIG. 9 shows only the twenty Doppler bins where adaptive interference suppression is most difficult. The injected target, marked by the circle in the figure, goes undetected while numerous other signals cross the threshold.

Outputs from the adaptive filter, as shown in FIG. 9, then typically enter a tracker. Ultimately, the tracker makes the final target determination, distinguishing false alarms from targets. In the case shown in FIG. 9, the large number of false alarms will overwhelm track processing. Furthermore, the known synthetic target does not even pass to the tracker, remaining well below the threshold. Nonhomogeneous interference corrupts the covariance matrix estimation and adaptive filter weight adjustment. Thus the failure to exclude nonhomogeneous auxiliary signals from covariance estimation seriously degrades adaptive filter performance, preventing it from performing its task of maximizing signal-to-interference plus noise ratio (SINR).

Figure 10:
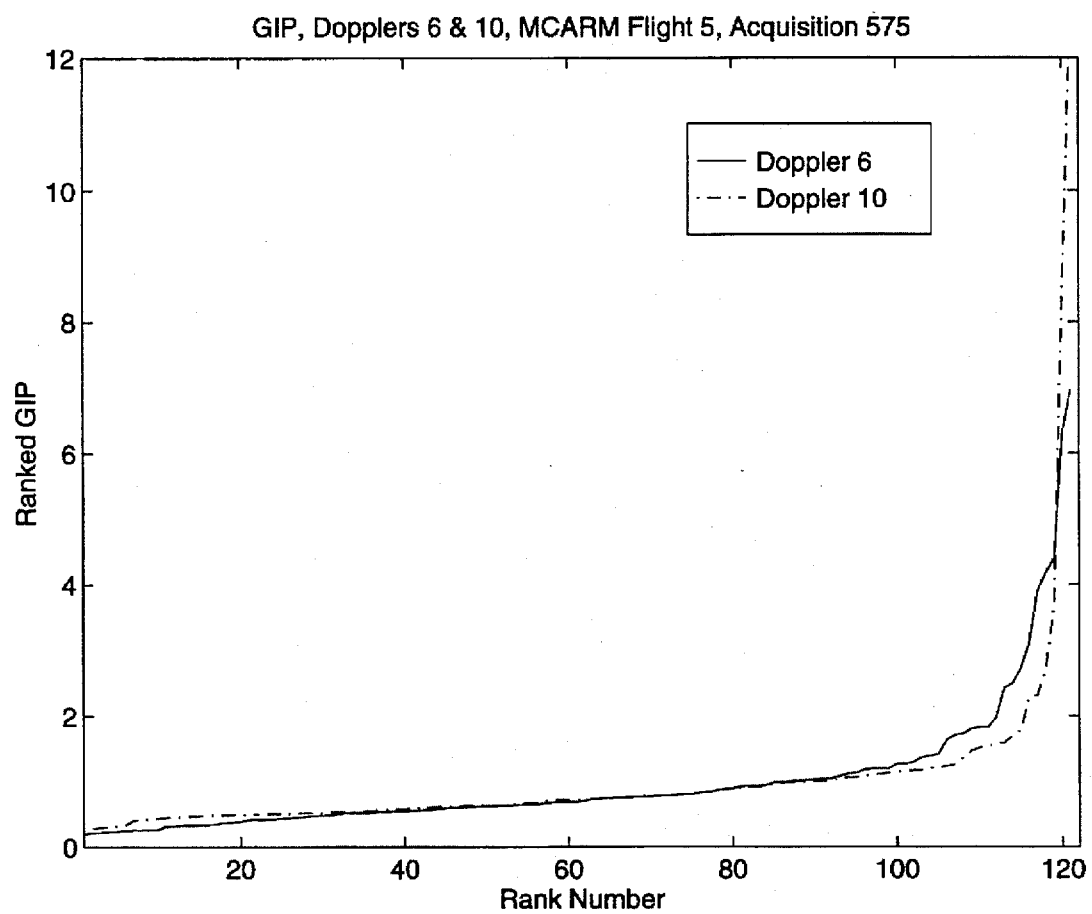
FIG. 10 shows the sorted nonhomogeneity detector output for measured data from the MCARM sensor for flight 5, acquisition 575, Doppler bins 6 and 10.

FIG. 10 shows the sorted nonhomogeneity detector output for Doppler bins six and ten over range cells 245 to 365. The measured data results in FIG. 10 are similar to the idealized plot of FIG. 6(A). Nonhomogeneity detector 150 assesses auxiliary signals for each of the 128 Doppler filter outputs and passes the results to auxiliary signal selector 160.

Figure 11:
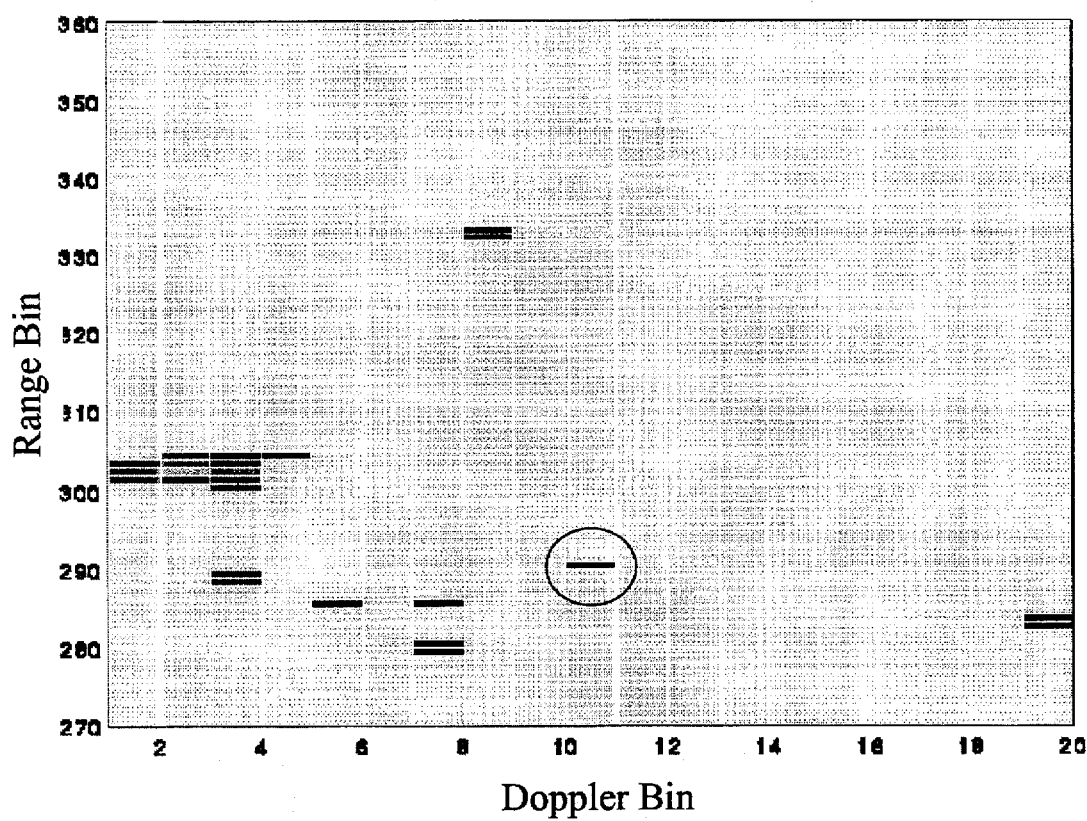
FIG. 11 is a chart that shows the detection results for adaptive filtering that incorporates the nonhomogeneity detector and auxiliary signal selector of the present invention using the same data as FIG. 9.

The fundamental task of auxiliary signal selector 160 is to identify homogeneous range cell indices for each Doppler bin. Auxiliary signal selector 160 passes the indices of homogeneous range cells to adaptive filter weight controller 140 that computes the covariance estimates and adaptive filter weights. FIG. 11 shows the detection performance for the FTS architecture incorporating the nonhomogeneity detection method and apparatus of the present invention to improve covariance matrix estimation, thereby improving adaptive filter performance. FIG. 11 directly compares with FIG. 9. All parameters remain the same, including the 20 dB threshold. The only difference between FIG. 11 and FIG. 9 is estimating the covariance matrix from the most homogeneous interference by means of the nonhomogeneity detection method and apparatus of the present invention.

FIG. 11 shows a dramatic improvement in adaptive filter performance results. The synthetic target is identifiable, and the number of false alarms is reduced substantially. Signal crossings at ranges 301 to 305 and Dopplers 5 through 8 correlate with vehicular motion on highway 13 of the Delmarva Peninsula where the data was collected. Thus some of the signal crossings correspond to targets of opportunity. The key point in comparing FIG. 9 and FIG. 11 is that removal of nonhomogeneous auxiliary signals greatly improves interference nulling through improved covariance estimation while maintaining maximal gain on the target.

Tracking is feasible with the outputs shown in FIG. 11. In this case the tracker can "lock on" to the synthetic target and targets of opportunity because of the dramatically improved SINR that results from the present invention.

Figure 12:
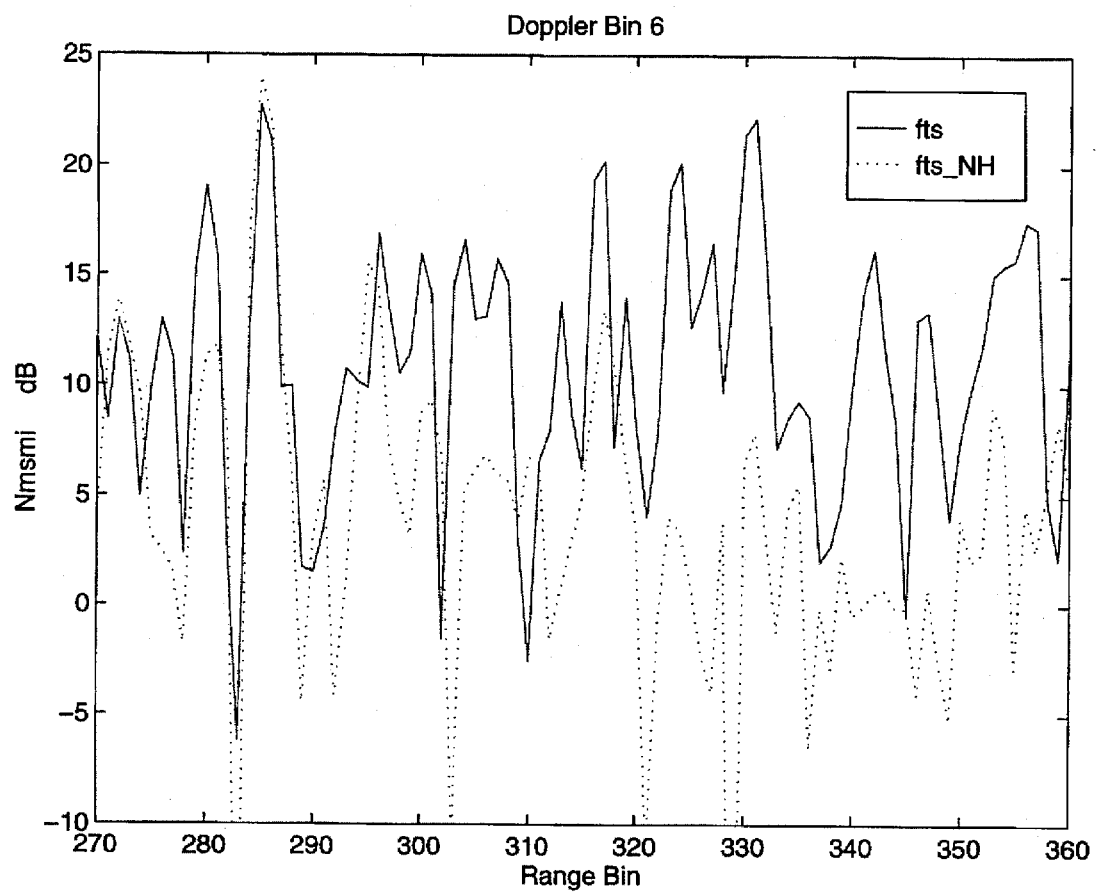
FIG. 12 is a chart comparing detection performance of adaptive filters using (1) the prior-art symmetric window method and (2) the nonhomogeneity detector methods of the present invention for MCARM data from flight 5, acquisition 575, Doppler bin 6.
Figure 13:
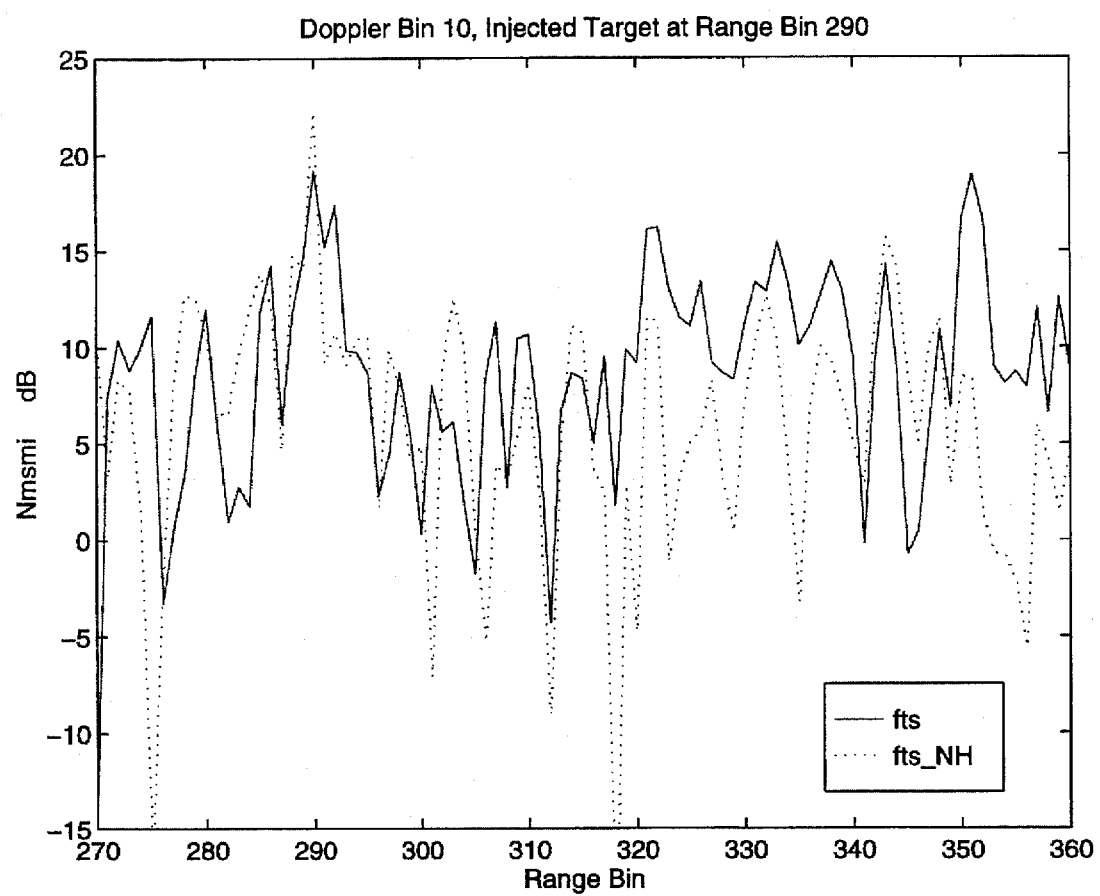
FIG. 13 is a chart comparing detection performance of respective adaptive filters as in FIG. 12 for MCARM data from flight 5, acquisition 575, Doppler bin 10.

FIGS. 12 and 13 compare the detection performance potential of the FTS architecture, with and without the nonhomogeneity detector, for Doppler bins six and ten. These results correspond to the results in FIGS. 9 and 11 before applying the 20 dB threshold. In these figures, "FTS" refers to the prior-art implementation of the FTS architecture and "FTS_NH" refers to the FTS architecture that incorporates the nonhomogeneity detection method and apparatus of the present invention. Observe from FIG. 12 that removal of nonhomogeneities from the covariance matrix estimate greatly improves the interference rejection of the filter, in some cases by more than 10 dB, while gain on a potential target at range cell 285 is maximal. In FIG. 13, the "FTS_NH" curve shows improved interference nulling with a 5 dB improvement in gain on the synthetic target at range cell 290. Note that, prior to applying the nonhomogeneity detector, interference at range cells 292, 320, 321 and 350, for example, all compete with the synthetic target at range cell 290. Thus FIGS. 12 and 13 show the dramatic improvement in SINR from the nonhomogeneity detection method and apparatus of the present invention incorporated into the Factored Time-Space adaptive filter architecture.

Furthermore, the nonhomogeneity detection method and apparatus of the present invention improves the performance of adaptive processing in electronic countermeasure ("ECM") environments as well. Since nonhomogeneous interference corrupts covariance estimates, thereby degrading adaptive filter performance, potential enemies can defeat airborne adaptive radar by electronically inducing nonhomogeneities. This form of jamming is known as coherent repeater jamming. The nonhomogeneity detection method and apparatus of the present invention provide an electronic counter-countermeasure ("ECCM") to coherent repeater jamming. Coherent repeater jamming can be automatically detected and removed from covariance estimation by the nonhomogeneity detection method and apparatus.

The apparatus for and methods of removing nonhomogeneous interference from adaptive filtering methods of signal processing of the present invention can also be applied to other fields than radar. For example, X-ray or other techniques of medical imaging and industrial inspection can be improved by the apparatus and methods of the present invention.

Clearly many modifications and variations of the present invention are possible in light of the above teachings and it is therefore understood, that within the inventive scope of the inventive concept, that the invention may be practiced otherwise than specifically claimed.

What is claimed is:

1. In a system for processing signals, a method, for identifying a one of presence and absence of at least one potential target, comprising the steps of:
   receiving a plurality of signals from an area potentially containing said at least one potential target, each member of said plurality of signals being multidimensional;
   separating said plurality of signals into a first group and a second group;
   computing a plurality of adaptive filter weights from said first group only;
   applying said plurality of adaptive filter weights to form an adaptive filter; and
   filtering said plurality of signals by means of said adaptive filter, whereby interference obscuring said at least one potential target is reduced.

2. The method of claim 1, wherein said step of separating is based on covariance among all members of said plurality of signals, wherein said covariance includes amplitude and phase information.

3. The method of claim 2, wherein:
   said first group comprises a first portion of said plurality of signals, said first portion being homogeneous in covariance;
   said second group comprises a second portion of said plurality of signals, said second portion being nonhomogeneous in covariance.

4. The method of claim 1, wherein said system for processing signals is a mobile radar.

5. The method of claim 4, wherein said mobile radar is an airborne radar.

6. The method of claim 5, wherein said airborne radar is a phased-array, pulsed-Doppler radar.

7. Apparatus for processing signals from which to identify a one of presence and absence of at least one potential target, which comprises:
   means for receiving a plurality of signals from an area potentially containing at least one potential target, each member of said plurality of signals being multidimensional;
   means for separating said plurality of signals into a first group and a second group;
   means for computing a plurality of adaptive filter weights from said first group only;
   means for applying said plurality of adaptive filter weights to form an adaptive filter; and
   means for filtering said plurality of signals with said adaptive filter, whereby interference obscuring said at least one potential target is reduced.

8. Apparatus as in claim 7, wherein said means for receiving is a mobile radar receiver.

9. Apparatus as in claim 8, wherein said mobile radar receiver is an airborne radar receiver.

10. Apparatus as in claim 9, wherein said airborne radar receiver is a phased-array, pulsed-Doppler radar receiver.

11. Apparatus as in claim 7, wherein:
   said first group comprises a first portion of said plurality of signals, said first portion being homogeneous in covariance;
   said second group comprises a second portion of said plurality of signals, said second portion being nonhomogeneous in covariance;
   said covariance is among all members of said plurality of signals; and
   said covariance includes amplitude and phase information.

12. Apparatus as in claim 7, wherein said means for separating includes a nonhomogeneity detector cooperating with an auxiliary signal selector.

13. Apparatus as in claim 12, wherein said nonhomogeneity detector and said auxiliary signal selector cooperate to separate said plurality of signals into said first group and said second group.

14. Apparatus as in claim 12, wherein said auxiliary signal selector determines membership in said first and said second groups based on first derivatives of said plurality of signals arranged in order after processing by said nonhomogeneity detector.

15. Apparatus in claim 12, wherein said auxiliary signal selector determines membership in said first and said second groups based on a mean of said plurality of signals, arranged in order after processing by said nonhomogeneity detector, and a chosen interval about said mean.

16. Apparatus as in claim 7, wherein each of said means for computing and said means for applying includes a digital signal processor.

17. Apparatus for dividing a plurality of multidimensional signals into at least two groups based on covariance of said signals, wherein said covariance is among all members of said plurality of signals.

18. Apparatus as in claim 17, wherein said covariance includes amplitude and phase information.

19. Apparatus as in claim 17, wherein said plurality represents an image.

20. Apparatus as in claim 17, wherein said apparatus includes a covariance detector.

21. Apparatus as in claim 20, wherein said covariance detector cooperates with a selection device that divides said plurality into at least two groups.

* * * * *